United States Patent [19]
Fuchs, Jr.

[11] Patent Number: 4,528,832
[45] Date of Patent: Jul. 16, 1985

[54] METHODS AND APPARATUS FOR INCREASING THE EFFICIENCY OF TUBING EXTRUSION

[76] Inventor: Francis J. Fuchs, Jr., 593 104th Ave., Naples, Fla. 33940

[21] Appl. No.: 461,215

[22] Filed: Jan. 26, 1983

[51] Int. Cl.³ .............................................. B21B 45/02
[52] U.S. Cl. ........................................ 72/45; 72/264; 264/209.2; 264/564; 264/565; 425/97; 425/107; 156/244.14
[58] Field of Search ................. 425/97, 381, 102, 107; 72/43, 44, 45, 264, 265, 273.5, 262, 370, 272; 264/564, 565, 209.2, 209.3; 156/244.14

[56] References Cited

U.S. PATENT DOCUMENTS 2,616,126 11/1952 Merck et al. ............................ 425/97
4,319,476 3/1982 Fuchs, Jr. ................................ 72/272
4,363,611 12/1982 Austen et al. .......................... 425/97

FOREIGN PATENT DOCUMENTS 1527831 8/1966 Fed. Rep. of Germany .......... 72/45

Primary Examiner—Caleb Weston
Assistant Examiner—Timothy W. Heitbrink
Attorney, Agent, or Firm—R. Gale Rhodes, Jr.

[57] ABSTRACT

Extrusion apparatus wherein a hollow cylindrical workpiece is advanced over the outer surface of a mandrel and through an extrusion die by motive force applied to the outer surface of the workpiece by an advancing drive member having an inner surface in operative engagement with the outer surface of the workpiece to produce a hollow cylindrical product of reduced diameter, and wherein a first moving force is required to produce relative movement between the mandrel and the workpiece and wherein a second moving force is required to produce relative movement between the drive member and the workpiece, the improvement wherein various structure are provided for reducing the first moving force relative to the second moving force to enhance the extrusion process and thereby increase its efficiency.

11 Claims, 4 Drawing Figures

METHODS AND APPARATUS FOR INCREASING THE EFFICIENCY OF TUBING EXTRUSION

BACKGROUND OF THE INVENTION

This invention relates generally to improved methods and apparatus for increasing the efficiency of tubing extrusion.

As known to those skilled in the tubing extrusion art, a hollow cylindrical workpiece is advanced over a mandrel and through an extrusion die to produce hollow product of reduced diameter which product, of course, is the tubing.

As is further known to those skilled in the art, with regard to providing relative movement between objects, the friction factor between the two objects is of paramount consideration. Such friction factor, as is further known to those skilled in the art, is defined as the moving force ($F_m$) required to slide the first object against or over the second object divided by the contact force ($F_c$) between the objects, which may be expressed as:

friction factor $(f) = F_m/F_c$

As is still further known to those skilled in the art, the friction factor (f) is a dimensionless quantity or number, is a characteristic of the two objects particularly a characteristic of their engaged surfaces, and therefore is constant given the same conditions, particularly the same surface conditions, of the two objects. Hence, for two objects the moving force may be expressed as:

$F_m = (f)F_c$

Therefore the force required to produce relative movement between the two objects may be increased by increasing the contact force $F_c$ and may be decreased by decreasing the contact force $F_c$. Accordingly, the efficiency of apparatus wherein relative movement between a first object and a second object is desired, and wherein relative movement between the second object and a third object is not desired, may be increased by decreasing the contact force between the first and second objects and by increasing the contact force between the second and third objects. The present invention is based upon this recognition.

More particularly, in the extrusion of tubing, especially the continuous extrusion of tubing, wherein a hollow cylindrical workpiece having inner and outer surfaces is advanced over the outer surface of a stationary cylindrical mandrel and through an annular extrusion die by force applied to the outer surface of the workpiece by an advancing drive member having an inner surface surrounding and in operative engagement with the outer surface of the workpiece to produce a hollow cylindrical product of reduced diameter (i.e. tubing), the efficiency of the extrusion apparatus may be increased by decreasing the moving force, $F_{m1}$, that is the force required to produce relative movement between the outer surface of the mandrel and the inner surface of the workpiece and/or by increasing the moving force, $F_{m2}$, that is the force required to produce relative movement between the outer surface of the workpiece and the inner surface of the drive member; relative movement between the workpiece and the drive member would, of course, stop advancement of the workpiece which would stop extrusion of the tubing, but by increasing the moving force, $F_{m2}$, required to produce relative movement between the workpiece and the drive member, larger or higher driving force can be applied to the workpiece by the drive member without causing relative movement therebetween and hence the efficiency of the tubing extrusion can be increased because higher driving forces applied to the workpiece will cause the workpiece to be advanced more positively over the mandrel and through the extrusion die.

The expression used variously in the following specification and appended claims, "reducing said first moving force (i.e. the moving force, $F_{m1}$, required to produce movement between the mandrel and the workpiece) relative to said second moving force (i.e. the moving force, $F_{m2}$, required to produce movement between the workpiece and the drive member) to enhance said extrusion process," is used to describe the simultaneous reducing of the first moving force ($F_{m1}$) and the increasing of the second moving force ($F_{m2}$), and to describe the reducing of the first moving force ($F_{m1}$) while the second moving force ($F_{m2}$) remains constant or vice versa.

It will be further understood that the expression, "an advancing drive member having an inner surface in operative engagement with the outer surface of the workpiece," is used to describe the condition where the inner surface of the advancing drive member is in direct frictional engagement with the outer surface of the workpiece; the condition where a shear transmitting medium, such as wax or heavy grease, is intermediate the inner surface of the advancing drive member and the outer surface of the workpiece and wherein shear forces are transmitted through the shear transmitting medium to the workpiece to advance and extrude the workpiece; and the condition where there is a low viscosity oil is intermediate the inner surface of the advancing drive member and the outer surface of the workpiece and wherein the drive member is forced into engagement with the workpiece to squeeze out excess low viscosity oil to produce a boundary lubrication condition between the workpiece and the drive member through which boundary lubrication condition the drive member advances the workpiece through the extrusion die.

Accordingly, it will be understood that the object of the present invention is the provision of improved methods of and apparatus for reducing the moving force required to produce relative movement between the mandrel and the workpiece relative to the moving force required to produce relative movement between the workpiece and the drive member whereby the extrusion of tubing is enhanced.

SUMMARY OF THE INVENTION

The foregoing object is achieved by the improved methods and apparatus of the present invention wherein the moving force between the mandrel and the workpiece is reduced relative to the moving force between the workpiece and the driving member and which in one embodiment of the present invention is accomplished by providing a body of pressurized fluid between the outer surface of the mandrel and the inner surface of the workpiece which pressurized fluid reduces the contact force between the mandrel and the workpiece thereby reducing the moving force therebetween and which pressurized fluid forces the workpiece against the drive member to increase the contact force therebetween thereby increasing the moving force therebetween, which in another embodiment of the present invention is accomplished by polishing the outer surface of the mandrel to reduce the driving force between the mandrel and the workpiece and by roughening the inner surface of the drive member to increase the driving force between the workpiece and the drive member, which in another embodiment of the present invention is accomplished by providing a first lubricant between the outer surface of the mandrel and the inner surface of the workpiece and by providing a second lubricant between the outer surface of the workpiece and the inner surface of the drive member and wherein the shear strength of the first lubricant is less than the shear strength of the second lubricant which shear strength differential decreases the moving force between the mandrel and the workpiece and increases the moving force between the workpiece and the drive member, and which in another embodiment of the present invention is accomplished by providing a coating of self-lubricating material on the outer surface of the mandrel which reduces the driving force between the mandrel and the workpiece.

DESCRIPTION OF THE PREFERRED EMBODIMENTS

Figure 1:
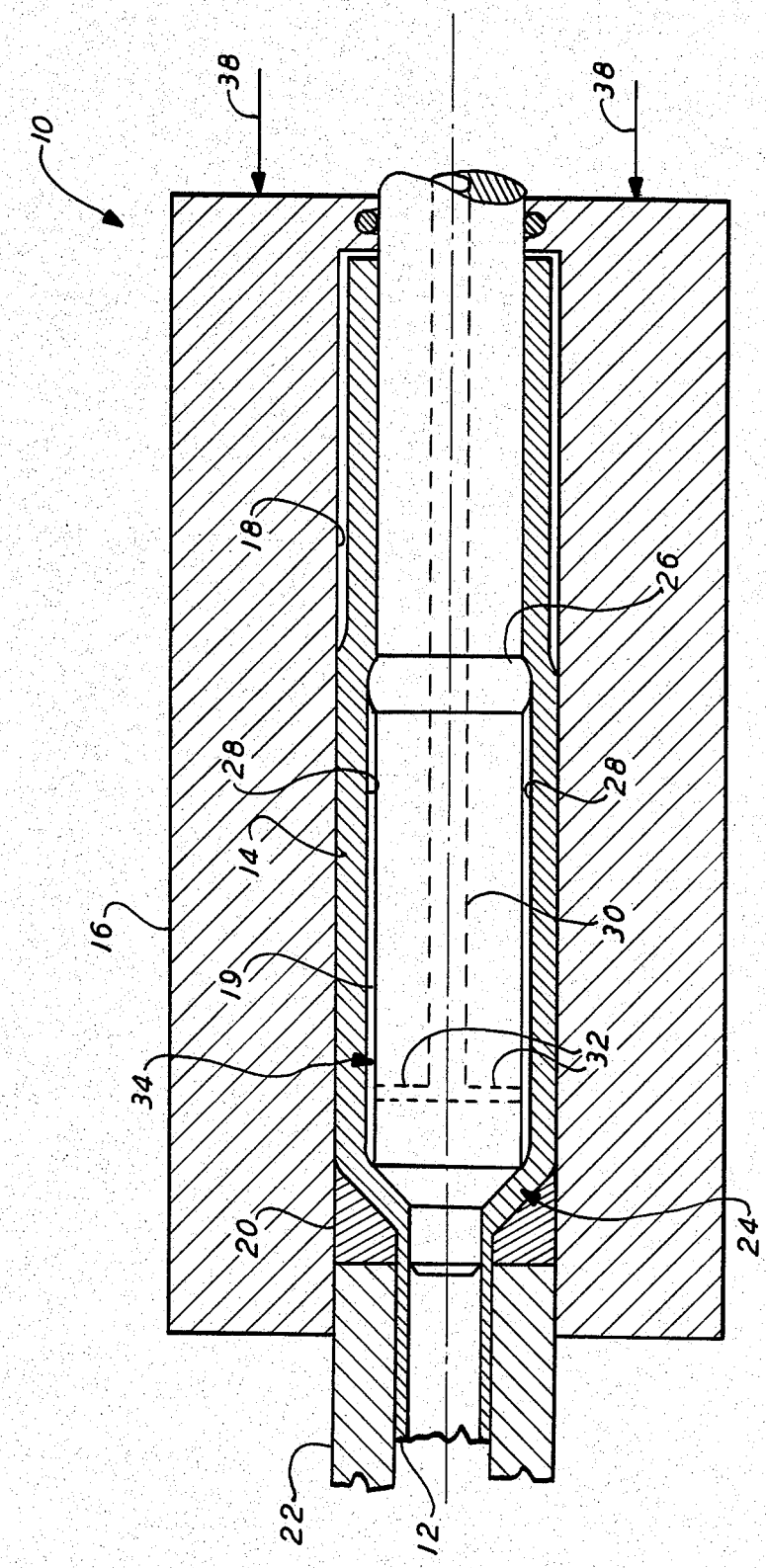
FIG. 1 is a diagrammatic illustration, in partial cross-section, of discrete hollow billet extrusion apparatus for the batch extrusion of tubing which apparatus embodies certain methods and apparatus of the present invention.

Referring now to FIG. 1, there is illustrated, diagrammatically and in partial cross-section, discrete hollow billet extrusion apparatus indicated by general numerical designation 10 for the batch extrusion of tubing 12 from a discrete hollow billet, or discrete hollow cylindrical workpiece, 14. The extrusion apparatus 10 includes an annular drive member 16 whose inner annular surface 18 is in operative engagement with the outer surface of the workpiece 14 to apply motive force thereto to advance the workpiece 14 over the outer surface of a stationary cylindrical mandrel 19 into engagement with and through an annular extrusion die 20 to produce the tubing 12; the annular extrusion die may be suitably supported by a suitable die stem 22 in the manner known to those skilled in the art.

The workpiece 14 engages the extrusion die 20 in a zone of deformation indicated by general numerical designation 24, and sealing means, such as provided by the enlarged annular mandrel portion 26, are provided to provide a seal between the outer surface of the mandrel 19 and the inner surface 28 of the workpiece 14 a predetermined distance rearwardly of the zone of deformation 24.

The mandrel 19 is provided with a longitudinally extending fluid passageway 30 (shown in dashed outline) and a plurality of radially disposed fluid passageways 32 (also shown in dashed outline) for communicating pressurized fluid (from a suitable source not shown) between the outer surface of the mandrel 19 and the inner surface 28 of the workpiece 14 to provide a generally annular body of pressurized fluid, indicated by general numerical designation 34, between the outer surface of the mandrel 19 and the inner surface 28 of the workpiece 14 between the zone of deformation 24 and the seal 26. The body of pressurized fluid 34 expands the workpiece 14 radially outwardly from the mandrel 14 and into increased engagement with the drive member 16 between the zone of deformation 24 and the sealing means 26 to decrease the contact force $F_{c1}$ between the outer surface of the mandrel 19 and the inner surface 28 of the workpiece 14 thereby reducing the moving force $F_{m1}$ between the mandrel 19 and the workpiece 14 and, simultaneously, to increase the contact force $F_{c2}$ between the workpiece 14 and the drive member 16 thereby increasing the moving force $F_{m2}$ therebetween whereby the moving force $F_{m1}$ between the mandrel 19 and the workpiece 14 is reduced relative to the moving force $F_{m2}$ between the workpiece 14 and the drive member 16 which, as described above, increases the efficiency of the tubing extrusion.

It will be understood by those skilled in the extrusion art that the extrusion apparatus 10 may be any one of several extrusion apparatus known to the prior art, that the drive member 16 may be suitably mounted for reciprocating movement and for being driven forward by suitable means, not shown, to produce the drive member driving force indicated by arrows 38—38, and that the mandrel 19 may be suitably mounted stationarily by suitable means, not shown.

Figure 2:
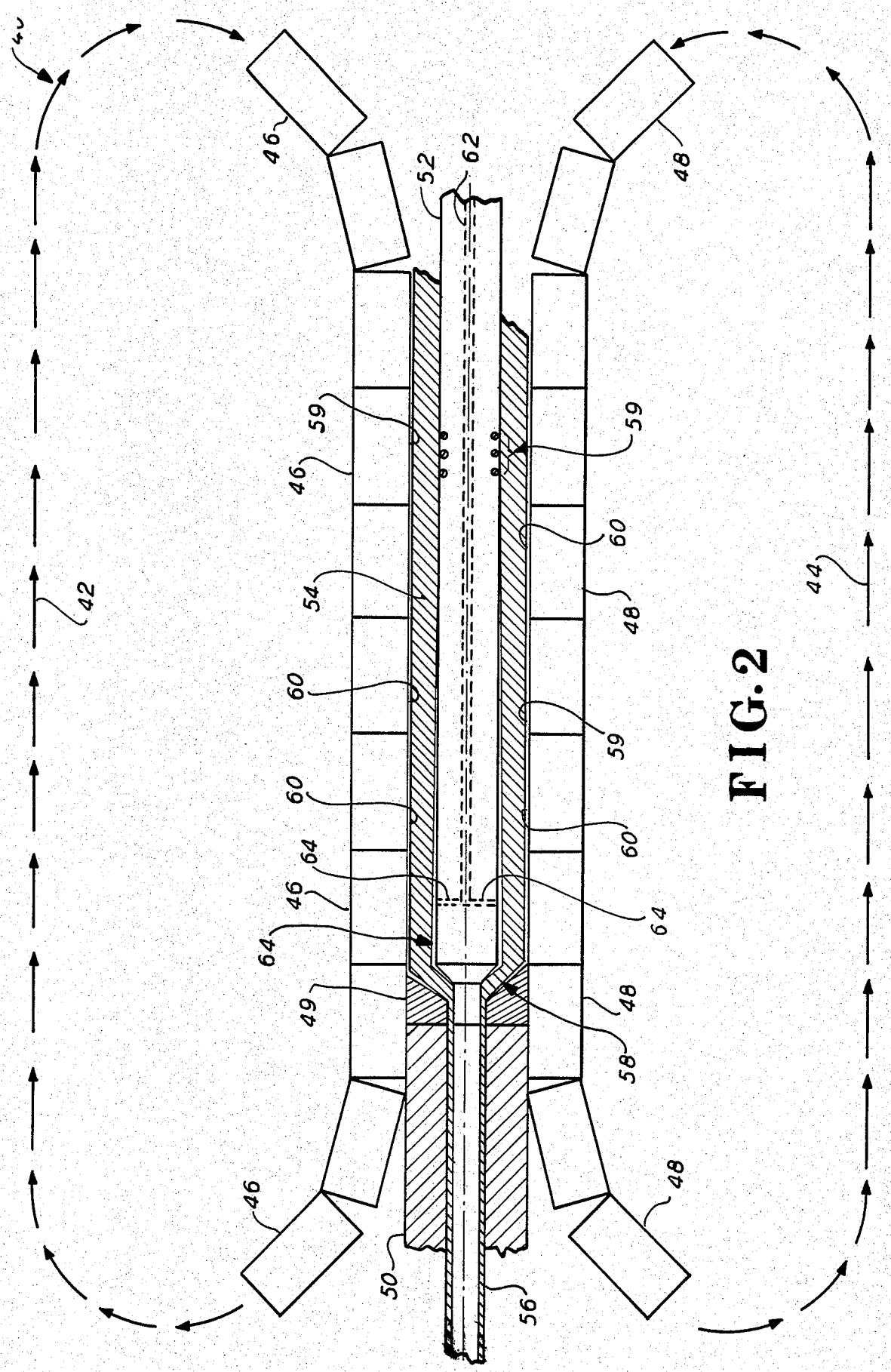
FIGS. 2 and 3 are respectively, alternate embodiments of continuous extrusion apparatus for the continuous extrusion of tubing and which apparatus, respectively, embody certain methods and apparatus of the present invention.

The methods and apparatus of the present invention embodied in the discrete hollow workpiece extrusion apparatus illustrated diagrammatically in FIG. 1 may also be embodied in apparatus for the continuous extrusion of an indefinite length of tubing from an indefinite length of hollow workpiece, as may be understood from reference to FIG. 2 and the continuous extrusion apparatus illustrated therein. Referring specifically to FIG. 2, continuous extrusion apparatus identified by general numerical designation 40 is illustrated, diagrammatically, by elliptical groups of arrows 42 and 44 and by groups or trains of gripping elements 46 and 48, and which continuous extrusion apparatus 40 may be, for example, the continuous extrusion apparatus disclosed in U.S. Pat. No. Re. 28,795 issued May 4, 1976 in the name of Francis J. Fuchs, Jr., as inventor; however, it will be expressly understood by those skilled in the art that the present invention is not limited to the use of any such specific continuous extrusion apparatus and may be used advantageously with other continuous extrusion apparatus known to the prior art. The continuous extrusion apparatus 40 may include an annular extrusion die 49 suitably secured to and mounted by a suitable die stem 50, in the manner known to those skilled in the art, and a suitable stationarily mounted cylindrical mandrel 52 which mandrel may also be any one of several known to the prior art. As may be better understood in greater detail with reference to the above-noted United States Reissue Patent, the trains or groups of gripping elements 46 and 48 are moved continuously around endless paths, indicated by elliptical loops of arrows 42 and 44 and in the direction of the arrows, to continuously apply motive force along the outer surface of the elongated hollow cylindrical workpiece 54 of indefinite length to continuously advance the workpiece 54 over the outer surface of the mandrel 52 and against and through the extrusion die 49 to continuously extrude the workpiece 54 into an indefinite length of tubing 56.

Similar to the embodiment of the present invention illustrated diagrammatically in FIG. 1, the workpiece 54 engages the extrusion die 49 in a zone of deformation indicated by general numerical designation 58, and sealing means, such as provided by the diagrammatically indicated plurality of generally annular O-rings indicated by general numerical designation 59, provide a seal between the outer surface of the mandrel 52 and the inner surfaces 60 of the groups or trains of gripping elements 46 and 48 a predetermined distance rearwardly of the zone of deformation 58.

The mandrel 52 is provided with a longitudinally extending fluid passageway 62 (shown in dashed outline) and a plurality of radially disposed fluid passageways 64 (also shown in dashed outline) for communicating pressurized fluid (from a suitable source not shown) between the outer surface of the mandrel 52 and the inner surfaces 60 of the groups or trains of gripping elements 46 and 48 to provide a generally annular body of pressurized fluid, indicated by general numerical designation 64, between the outer surface of the mandrel 52 and the inner surface of the workpiece 54 between the zone of deformation 58 and the sealing means 59. The body of pressurized fluid 64 expands the workpiece 54 radially outwardly from the mandrel 52 and into increased engagement with the surfaces 60 of the groups or trains of gripping elements 46 and 48 between the zone of deformation 58 and the sealing means 59 to decrease the contact force $F_{c1}$ between the outer surface of the mandrel 52 and the inner surface of the workpiece 54 thereby reducing the moving force $F_{m1}$ between the mandrel 52 and the workpiece 54 and, simultaneously, to increase the contact force $F_{c1}$ between the workpiece 54 and the outer surfaces 60 of the groups or trains of gripping elements 46 and 48, thereby increasing the moving force $F_{m2}$ therebetween whereby the moving force $F_{m1}$ between the mandrel 52 and the workpiece 54 is reduced relative to the moving force $F_{m2}$ between the workpiece 54 and the groups or trains of drive members 46 and 48 which, as described above, increases the efficiency of the continuous tubing extrusion.

Figure 3:
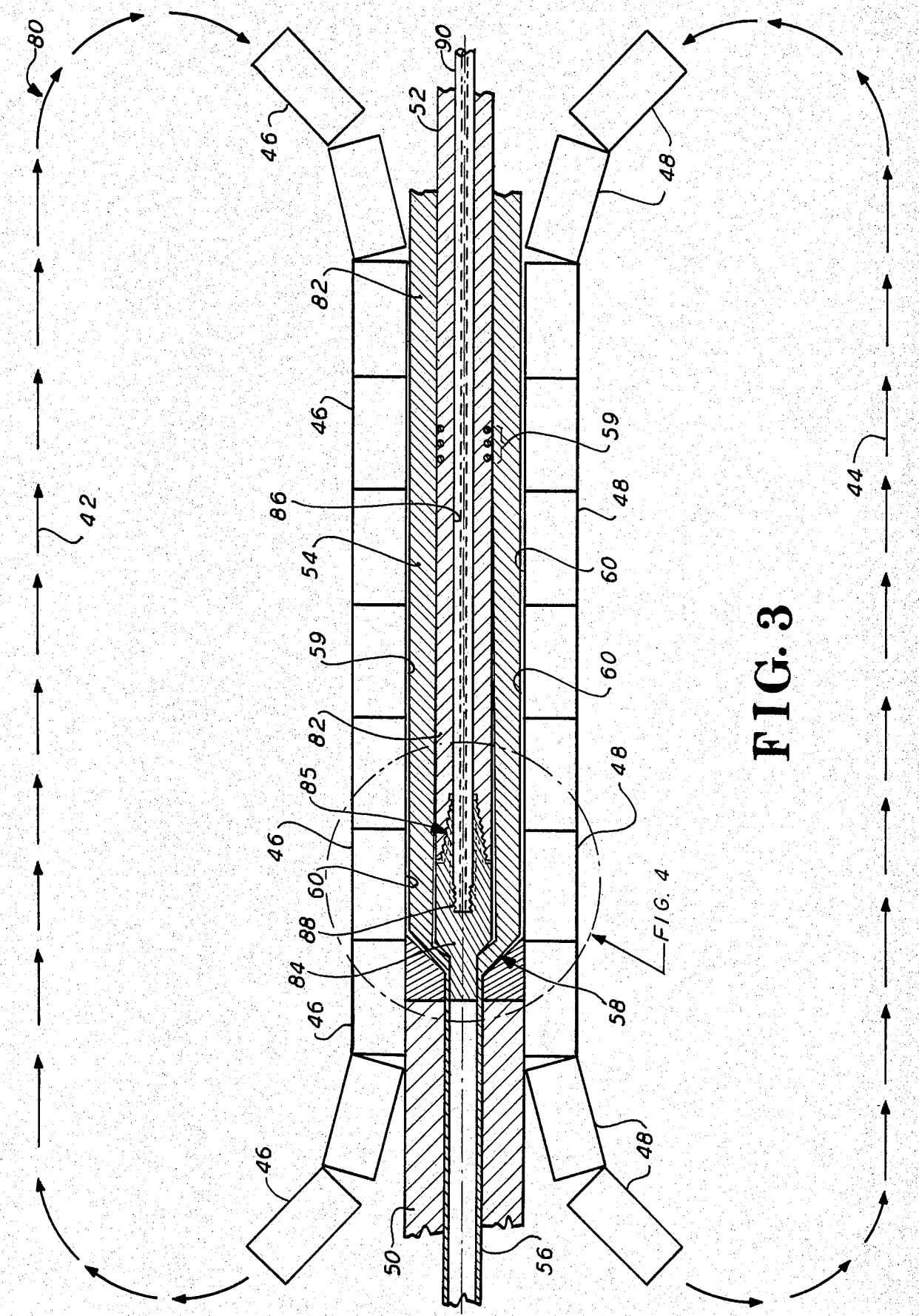
Figure 4:
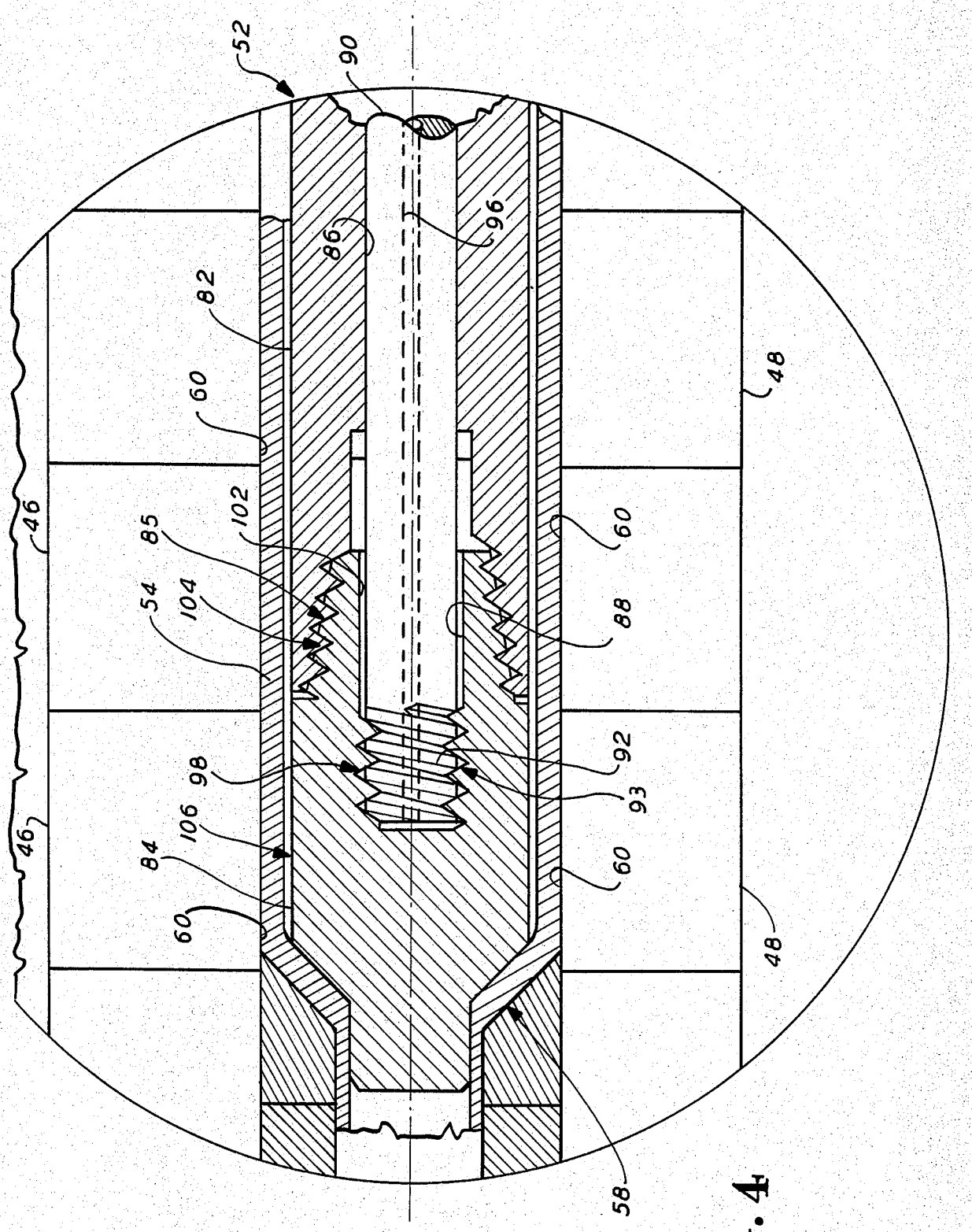
FIG. 4 is an enlarged view of the encircled portion of FIG. 3 for clarity of understanding.

Referring now to FIGS. 3 and 4, and firstly to FIG. 3, there is shown a further alternate embodiment of the present invention for continuously extruding an indefinite length of hollow cylindrical workpiece into an indefinite length of tubing, wherein the continuous extrusion apparatus is indicated by general numerical designation 80 and wherein in FIG. 3 the structure identical to the structure of the alternate embodiment of FIG. 2 is given the identical numerical designation and wherein the different structure of the alternate embodiment of FIG. 3 is given different numerical designations.

Accordingly, with regard to the alternate structure of the alternate embodiment of FIG. 3, the mandrel 52 includes a rearward mandrel stem 82 and a forward mandrel point 84 with the forward end of the mandrel stem 52 and the rearward end of the mandrel point 84 engaged in a threaded interconnection indicated by numerical designation 85. A centrally formed axial bore 86 extends through the mandrel stem 82 and a centrally formed axial bore 88 extends a predetermined distance into the mandrel point with the bottom of the axial bore 88 being threaded as shown. A fluid tube 90 resides in the axial bores 86 and 88 and is provided with a forward threaded end 92 in threaded interconnection, indicated by general numerical designation 93, with the threaded bottom of the axial bore 88 as shown. A fluid passageway 96, provided centrally of the fluid tube 90, is in fluid communication with the bottom of the threaded bore 88 formed in the mandrel point 84, and, as may be better seen in FIG. 4, the threaded interconnection 93 between the end of the fluid tube 90 and the threaded bottom of the axial bore 88 formed in the mandrel point 84 provide a fluid passageway, indicated by general numerical designation 98 along the threaded interconnection 93 which fluid passageway 98 is in communication with the bottom of the threaded bore 88 and an annular space 102 extending between the outer surface of the forward end of the fluid tube 90 and the axial bore 88 formed in the mandrel stem 82. The threaded interconnection 85 between the forward end of the mandrel stem 82 and the rearward end of the mandrel point 84 provides a fluid passageway indicated by general numerical designation 104, which fluid passageway 104 is in communication with the annular space 102 and the annular space between the outer surface of the mandrel 52 and the inner surfaces 60 of the groups or trains of gripping elements 46 and 48 between the zone of deformation 58 in the sealing means 59. Upon pressurized fluid, from a suitable source not shown, being admitted into the fluid passageway 96 formed in the fluid tube 90, the pressurized fluid passes through the fluid passageway 96 to the bottom of the threaded axial bore 88 and through the fluid passageway 98 provided along the threaded interconnection 93 to the annular space 102 and through the fluid passageway 104 provided along the threaded interconnection 85 into the annular space indicated by general numerical designation 106 between the outer surface of the mandrel and the inner surface of the workpiece 54 between the zone of deformation 58 and the sealing means 59 to expand the workpiece radially outwardly from the outer surface of the mandrel and into increased engagement with the inner surfaces 60 of the gripping elements 46 and 48 to reduce the contact force $F_{c1}$ between the mandrel and the workpiece thereby reducing the moving force $F_{m1}$ therebetween and to increase the contact force between the outer surface of the workpiece 54 and the inner surfaces 60 of the gripping elements 46, 48 to increase the contact force $F_{c2}$ therebetween thereby reducing the moving force $F_{m2}$ therebetween whereby the moving force $F_{m1}$ between the mandrel 52 and workpiece 54 is reduced relative to the moving force $F_{m2}$ between the workpiece and the groups or trains of gripping elements 46 and 48 thereby enhancing the continuous extrusion of the tubing 56.

As will be further understood by those skilled in the art, and referring to the fluid passageways 98 and 104 provided respectively along the threaded interconnections 93 and 85, radially outwardly extending threads typically do not extend to the bottom of the mating radially inwardly extending threads and hence a continuous spiral groove extends between the ends of the radially outwardly extending threads and the bottoms of the radially inwardly extending threads whereby the noted fluid passageways are provided; alternatively, and as will be understood by those skilled in the art, longitudinally extending flats could be provided radially at predetermined points along the outwardly extending threads to insure fluid passageways extending along the threaded interconnections.

Still further alternatively, and according to the further teachings of the methods and apparatus of the present invention, the moving force $F_{m1}$ between the mandrels 19 and 52 and the workpieces 14 and 54, respectively, may be reduced relative to the moving force $F_{m2}$ between the workpieces 14 and 54 and the drive members 16 and the gripping elements 46 and 48, respectively by polishing the outer surfaces of the mandrels 19 and 52 which reduces the first moving force $F_{m1}$ and by roughening the inner surfaces 18 of the drive members 16 and by roughening the inner surfaces 60 of the gripping elements 46 and 48, or by providing a first lubricant between the outer surfaces of the mandrel and the inner surfaces of the workpieces and a second lubricant between the outer surfaces of the workpieces and the inner surfaces of the drive members and gripping elements whereby the shear strength of the first lubricant is less than the shear strength of the second lubricant which shear strength differential decreases the first moving force $F_{m1}$ *and increases the second moving force $F_{m2}$*; or by providing a predetermined coating of self-lubricating material on the outer surfaces of the mandrels 19 and 52 which reduces the first moving force $F_{m1}$, which self-lubricating material may be any one of several known to the art, for example Nylatron, a reinforced Nylon, reinforced with molybdenum disulfide and Teflon, a trademark of the DuPont Company for identifying one of their self-lubricating materials.

It will be noted that the method and apparatus of the present invention for reducing the first moving force relative to the second moving force to enhance the extrusion embodied in the discrete hollow billet extrusion apparatus of FIG. 1 are the same methods and apparatus embodied in the continuous extrusion apparatus of FIG. 2; similarly, it will be understood that the methods and apparatus of the present invention embodied in the continuous extrusion apparatus of FIG. 3 could also be embodied in discrete hollow billet extrusion apparatus, such as for example the discrete hollow billet extrusion apparatus of the type disclosed in FIG. 1.

It will be further understood by those skilled in the art that many modifications and variations of the present invention may be made without departing from the spirit and the scope thereof.

What is claimed is:

1. In extrusion apparatus wherein a hollow cylindrical workpiece having inner and outer surfaces is advanced over the outer surface of a stationary cylindrical mandrel and through an annular extrusion die by motive force applied to the outer surface of the workpiece by an advancing drive member having an inner surface in operative engagement with the outer surface of the workpiece to produce a hollow cylindrical product of reduced diameter, and wherein a first moving force is required to produce relative movement between the mandrel and the workpiece and where a second moving force is required to produce relative movement between the drive member and workpiece, the improvement comprsing:

means for reducing said first moving force relative to said second moving force to enhance said extrusion process.

2. Apparatus according to claim 1 wherein said means for reducing said first moving force relative to said second moving force comprises means for providing pressurized fluid between the outer surface of the mandrel and the inner surface of the workpiece which pressurized fluid reduces the contact force between the mandrel and the workpiece thereby reducing said first moving force and which pressurized fluid increases the contact force between the outer surface of the workpiece and the inner surface of the drive member thereby increasing said second moving force.

3. Apparatus according to claim 1 wherein said means for reducing said first moving force relative to said second moving force comprises a polished surface provided on the outer surface of the mandrel which reduces said first moving force and a roughened surface provided on the inner surface of said drive member which increases said second moving force.

4. Apparatus according to claim 1 wherein said means for reducing said first moving force relative to said second moving force comprises a first lubricant provided between the outer surface of the mandrel and the inner surface of the workpiece and a second lubricant provided between the outer surface of the workpiece and the inner surface of the drive member and wherein the shear strength of said first lubricant is less than the shear strength of said second lubricant which shear strength differential decreases the first moving force and increases the second moving force.

5. Apparatus according to claim 1 wherein said means for reducing said first moving force relative to said second moving force comprises a coating of predetermined self-lubricating material provided on the outer surface of the mandrel which reduces said first moving force.

6. Apparatus according to claim 5 wherein said coating of predetermined self-lubricating material comprises reinforced Nylon, reinforced with molybdenum disulfide and Teflon.

7. Apparatus according to claim 1 wherein said workpiece engages said extrusion die in a zone of deformation and wherein said means for reducing said first moving force relative to said second moving force comprise sealing means providing a seal between the outer surface of said mandrel and the inner surface of said workpiece a predetermined distance rearwardly of said zone of deformation and wherein said means further comprise communicating means for communicating pressurized predetermined fluid between the outer surface of the mandrel and the inner surface of the workpiece between said zone of deformation and said sealing means which pressurized fluid expands the workpiece radially outward from the mandrel and into increased engagement with the drive member between the zone of deformation and said sealing means to reduce the contact force between the mandrel and the workpiece thereby reducing said first moving force and increasing the contact force between the workpiece and the drive member thereby increasing said second moving force.

8. Apparatus according to claim 7 wherein said communicating means comprise a longitudinal fluid passageway extending through the mandrel along a predetermined portion of the length thereof and at least one radially disposed fluid passageway positioned at the forward portion of the mandrel and communicating the longitudinal fluid passageway with the outer surface of the mandrel and inner surface of the workpiece.

9. Apparatus according to claim 1 wherein said workpiece engages said extrusion die in a zone of deformation and wherein sealing means are provided to provide a seal between the outer surface of said mandrel and the inner surface of said workpiece a predetermined distance rearwardly of said zone of deformation, wherein said mandrel includes a rearward end of the mandrel stem and a forward mandrel point with the forward end of the mandrel stem and the rearward end of the mandrel point engaged in first threaded interconnection, and wherein said means further comprise:

a centrally formed first axial bore extending through said mandrel stem, a centrally formed second axial bore extending a predetermined distance into said mandrel point with the bottom of the second axial bore being threaded, a fluid tube residing in said first and second axial bores and provided with a forward threaded end in second threaded communication with said threaded bottom of said second axial bore and with the outer surface of the forward portion of said fluid tube and the rearward portion of said second axial bore providing a first annular space between the outer surface of the forward end of said fluid tube and the rearward portion of said second axial bore, said first annular space being in communication with said second threaded interconnection, a first fluid passageway extending through said fluid tube and in communication with said threaded bottom of said second axial bore, a second fluid passageway extending along said second threaded interconnection and in communication with the bottom of said second axial bore and said first annular space, a third fluid passageway extending along said first threaded interconnection and in communication with said first annular space and a second annular space extending between the outer surface of said mandrel and the inner surface of said workpiece between said zone of deformation and said sealing means, upon pressurized fluid being admitted into and through said first, second and third fluid passageways, said pressurized fluid entering said second annular space and expanding said workpiece radially outwardly from said mandrel and into increased engagement with said drive member between said zone of deformation and said sealing means to decrease the contact force between the mandrel and the workpiece and increase the contact force between the workpiece and the drive member thereby decreasing said first moving force and increasing said second moving force.

10. In apparatus including groups of trains of gripping elements for moving in endless paths in continuous operative engagement with the entire outer surface of an elongated hollow cylindrical workpiece to continuously apply motive force to said workpiece to continuously advance said workpiece over the outer surface of a mandrel and through an extrusion die to continuously produce elongated hollow cylindrical product of reduced diameter and indefinite length, and wherein a first moving force is required to produce relative movement between the outer surface of the mandrel and the inner surface of the workpiece and wherein a second moving force is required to produce relative movement between the outer surface of the workpiece and said trains of gripping elements, the improvement comprising:

means for reducing said first moving force relative to said second moving force to enhance said continuous extrusion of said product.

11. Apparatus according to claim 10 wherein said means for reducing said first moving force relative to said second moving force comprises means for providing pressurized fluid between the outer surface of the mandrel and the inner surface of the workpiece which pressurized fluid reduces the contact force between the mandrel and the workpiece thereby reducing said first moving force and which pressurized fluid increases the contact force between the outer surface of the workpiece and the inner surface of the gripping elements thereby increasing said second moving force.

* * * * *